United States Patent [19]

Chiba

[11] Patent Number: 5,125,081
[45] Date of Patent: Jun. 23, 1992

[54] INTER-CONFIGURATION CHANGING CONTROLLER BASED UPON THE CONNECTION AND CONFIGURATION INFORMATION AMONG PLURALITY OF CLUSTERS AND THE GLOBAL STORAGE

[75] Inventor: Takashi Chiba, Kawasaki, Japan

[73] Assignee: Fujitsu Limited, Kawasaki, Japan

[21] Appl. No.: 313,883

[22] Filed: Feb. 23, 1989

[30] Foreign Application Priority Data

Feb. 24, 1988 [JP] Japan .................. 63-41031

[51] Int. Cl.$^5$ .................. G06F 13/12; G06F 13/00
[52] U.S. Cl. .................. 395/325; 364/DIG. 1;
364/228.1; 364/229; 364/229.4; 364/230.6;
364/238.4; 364/243; 364/259.1
[58] Field of Search ... 364/200 MS File, 900 MS File

[56] References Cited

U.S. PATENT DOCUMENTS

| 4,014,005 | 3/1977 | Fox et al. | 364/200 |
|---|---|---|---|
| 4,030,072 | 6/1977 | Bjornsson | 364/200 |
| 4,056,844 | 11/1977 | Izumi | 364/200 |
| 4,075,693 | 2/1978 | Fox et al. | 364/200 |
| 4,266,271 | 5/1981 | Chamoff et al. | 364/200 |
| 4,349,871 | 9/1982 | Lary | 364/200 |
| 4,370,708 | 1/1983 | Bruce et al. | 364/200 |
| 4,480,307 | 10/1984 | Budde et al. | 364/200 |
| 4,683,533 | 7/1987 | Shiozaki et al. | 364/200 |
| 4,970,640 | 11/1990 | Beardsley et al. | 364/200 |

Primary Examiner—Thomas C. Lee
Assistant Examiner—Krisna Lim
Attorney, Agent, or Firm—Staas & Halsey

[57] ABSTRACT

A configuration control system for changing a system configuration of a data processing system. The configuration control system has a plurality of clusters and at least one global storage unit. Each of the clusters has a channel processing unit, at least one central processing unit, at least one main storage unit, a memory control unit and a service processor. The at least one global storage unit has the plural clusters in common. The configuration control system includes a first configuration control device for holding connection information of each unit in a cluster; and a second configuration control device for holding configuration control information of the global storage unit and the cluster. The second configuration control device controlled independently to the first configuration control device. The system also includes a device for generating a specific order for writing the configuration control information to the second configuration control device; and a device for setting a corresponding bit of the second configuration control device to a connection state when a bus between the global storage unit and the cluster is set to the connection state by the first configuration control device. The connection configuration between the global storage unit and the cluster designated by the first configuration control device is automatically set to the second configuration control device, and the second configuration control device is controlled independently to the first configuration control device based on the specific order.

8 Claims, 7 Drawing Sheets

| BYTE HEX | CONTENT OF CHANGE OF CONFIGURATION |
|---|---|
| 0 2 | DESIGNATION OF CONNECTION |
| 0 3 | DESIGNATION OF DISCONNECTION |
| OTHER | NOT CHANGE |

INTER-CONFIGURATION CHANGING CONTROLLER BASED UPON THE CONNECTION AND CONFIGURATION INFORMATION AMONG PLURALITY OF CLUSTERS AND THE GLOBAL STORAGE

BACKGROUND OF THE INVENTION

1. Field of the Invention

The present invention relates to a configuration control system, more particularly, it relates to a control system for changing the system configuration of a data processing system. The configuration control system according to the present invention is advantageous for use in a large scale and complicated data processing system constituted by, for example, a plurality of clusters and at least one global storage unit, each cluster having a channel processing unit, at least one central processing unit, at least one main storage unit, a memory control unit and a service processor, and each of the global storage units supporting in common these plural clusters. Usually, the above type data processing system is divided into a current system and a stand-by system for achieving a high reliability and high speed processing in conjunction with each of the global storage units.

2. Description of the Related Art

The management of the system configuration of the data processing system is usually performed by each of the configuration control registers provided in the memory control unit and the global storage unit. That is, each of the units constituting the cluster is connected to or disconnected from other units by turning ON/OFF ("1" or "0") a specific bit of the configuration control register.

In this conventional data processing system, the system configuration is relatively small scale. Further, a "non-stop system" (a "non-stop system" is one in which the operation of the system is not stopped when changing the system configuration) is not usually required by an end user. Accordingly, the configuration is only changed by the service processor using a general scan-in/out function usually provided in data processing systems. In this case, the central processing unit sends a command to change the configuration to the service processor and the service processor performs the above steps. Therefore, it is not necessary to add new configuration changing hardware to the data processing unit, and accordingly, it is possible to economically perform the configuration change.

In this case, the configuration control resister is operated by a clock signal different from the clock signal used to operate the cluster. Accordingly, the whole system must be temporarily stopped to ensure normal operation of the cluster.

Recent data processing systems have become larger scale; for example, a typical large scale data processing system constitutes a plurality of clusters with global storage units for controlling each of the clusters as explained above. In this large scale system, any one service processor can change the configuration of the whole system, and in this case, the whole system is stopped for a considerable length of time. As a result, a "non-stop system" enabling a change of the configuration without stopping the system is now required in large scale data processing systems to achieve a high speed control when changing a configuration.

SUMMARY OF THE INVENTION

The object of the present invention is to provide a configuration control system in a data processing system enabling a high speed control when changing the configuration.

In accordance with the present invention, there is provided a configuration control system for changing a system configuration of a data processing system having a plurality of clusters and at least one global storage unit, each cluster having a channel processing unit, at least one central processing unit, at least one main storage unit, a memory control unit and a service processor, each global storage unit having the plurality of clusters in common, the configuration control system comprising: a first configuration control device for holding connection information of each unit in the cluster; a second configuration control device for holding configuration control information between the global storage unit and the cluster and independently controlled from the first configuration control device; a device for generating a specific order for writing/reading the configuration control information to the second configuration control device; and a device for setting a corresponding bit of the second configuration control device to a connection state when a bus between the global storage unit and the cluster is set to the connection state by the first configuration control device; wherein the connection configuration between the global storage unit and the cluster designated by the first configuration control device is automatically set to the second configuration control device, and the second configuration control device is controlled independently of the first configuration control device based on the specific order.

DESCRIPTION OF THE PREFERRED EMBODIMENTS

Before describing the preferred embodiments, an explanation will be given of a conventional configuration control system.

Figure 1:
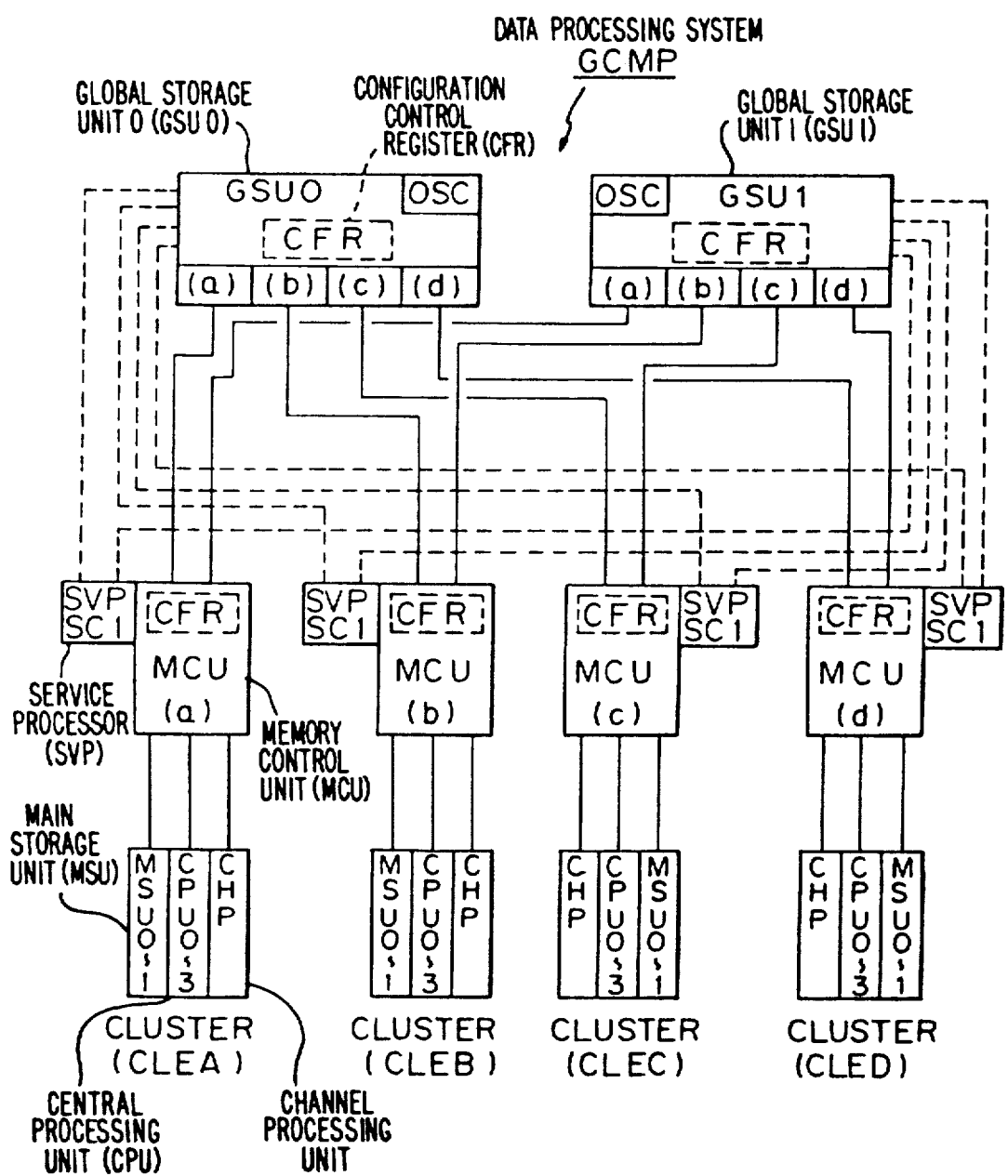
FIG. 1 is a schematic block diagram of a conventional data processing system.

FIG. 1 is a schematic block diagram of one example of a conventional data processing system having a large scale and a complicated system configuration. This data processing system GCMP is constituted by two global storage units GSU0 and GSU1 and clusters CLEA TO CLED. Each of the clusters CLEA to CLED comprises a service processor SVP, a memory control unit MCU, a channel processor CHP, central processing units CPU0 to CPU3, and main storage units MSU0 and MSU1, and each of the global storage units GSU0 and GSU1 supports in common the clusters CLEA to CLED. The configuration control register CFR is provided in each of memory control units MCU and each of the global storage units GSU. The reference letters (a) to (d) are interface sections including interface circuits, AND gates and the like.

In this large scale data processing system, the system configuration can be changed in accordance with a requirement from, for example, the cluster CLEA, if a failure occurs in any other cluster. The change of the configuration is performed by changing the connection or disconnection between each of the units constituting the cluster. Such a connection or disconnection is performed by a specific bit from the configuration control register CFR or by a status indicating signal generated from each unit.

As the status indicating signal, a power-ON signal and a ready signal indicating the enable state of each unit are provided. The connection state of the cluster CLEA means that the all status indicating signals related to the cluster CLEA are "ON" and buses connected to the configuration control register CFR are activated (set to the online state). The information indicating the above states (configuration control information) is stored in the main storage units MSU0 and MSU1 in each cluster CLEA to CLED, the configuration control information stored in the main storage units is updated by a specific program from the cluster, and the updated information is loaded from the main storage unit into the configuration control register CFR by the command from the service processor and held therein.

Figure 2:
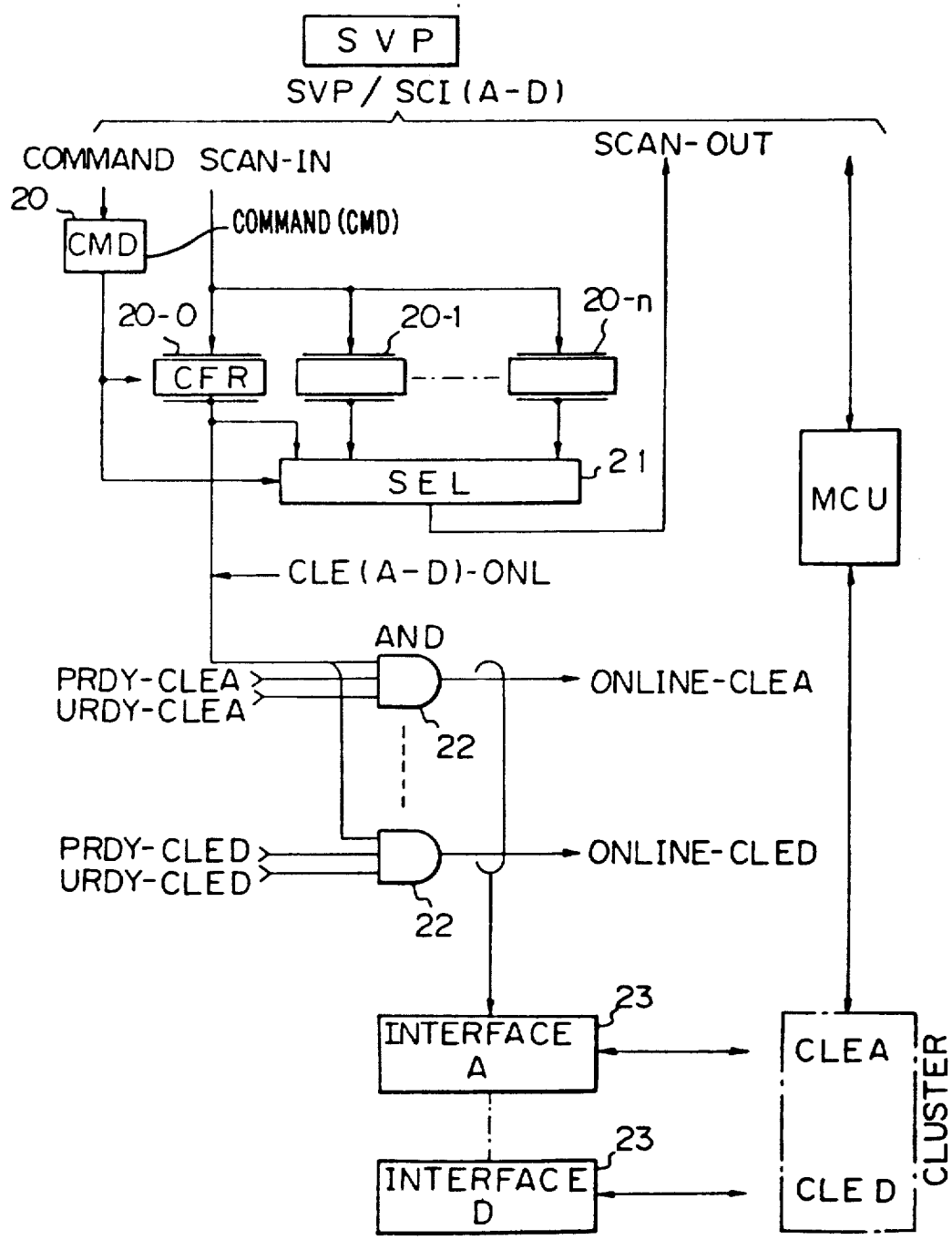
FIG. 2 is a schematic block diagram for explaining the conventional method for changing the system configuration.

FIG. 2 is a schematic block diagram for explaining the conventional control system for changing the system configuration. The operations are explained below.

WRITE OPERATION OF CONFIGURATION CONTROL INFORMATION

The central processing unit CPU in each cluster generates a specific order indicating a write operation to the service processor SVP, and sends a scan-out command to the service processor SVP. When the service processor SVP receives this command, the service processor SVP generates the scan-out command CMD (20) and sends it to the configuration control register CFR (20-0 to 20-n). The contents of the configuration control register CFR, i.e., the control information and the status indicating signal (PRDY-CLEA and URDY-CLEA) are scanned out through the selector SEL (21). The data scanned out from the configuration control register CFR is stored in the memory of the service processor SVP through the known SCI-interface.

When the service processor SVP receives the scan-out data, the service processor SVP generates configuration control information having a predetermined form based on the content of the configuration control register CFR and the status indicating signal. The configuration control information from the service processor SVP is stored in main storage unit MSU in the cluster designated by the store command from the service processor SVP.

When the store operation to the main memory unit is completed, the service processor SVP sends an end information (END) signal to the central processing unit CPU in each cluster CLE.

The configuration control information stored in the main memory unit MSU can be updated by the specific program performed by the central processing unit CPU.

LOAD OPERATION OF THE CONFIGURATION CONTROL INFORMATION

The central processing unit CPU generates the specific order indicating a load operation and sends it to the service processor SVP, commanding the service processor SVP to perform the scan-in operation. The service processor SVP reads out the configuration control information from the main memory unit MSU and writes the configuration control information to the memory of the service processor SVP. The service processor SVP outputs the scan command, and the configuration control information is set to the configuration control register in each cluster with the status indicating signal possessed by each cluster, thus changing the content of the configuration control register. When the load operation is completed, the service processor SVP sends the end information (END) signal to the central processing unit CPU in each cluster.

In FIG. 2, each of AND gates 22 is provided for setting the interface 23 provided between the global storage unit GSU and the cluster CLE to the online state (ONLINE-CLEA to ONLINE-CLED). For example, for the cluster CLEA, the corresponding bit of the configuration control register CFR is turned ON, and the states of the power-ON signal (PRDY-CLEA) and the state indicating signal (URDY-CLEA) of the cluster CLEA are then judged by the AND gate, with the result that, when all of the conditions mentioned above coincide, the interface 23 can be set to a valid state.

Each of interface circuits A to D (23) is provided in the interface (a) to (d) in the global storage unit and connects the global control unit GSU and the corresponding memory control unit MCU. The control signal, for example, a request signal (REQ) between the global storage unit GSU and the cluster CLEA to CLED is made valid by obtaining a conjunction of the output signal of the AND gate 22.

Further, since the configuration control register CFR must be rewritten prior to all other processings of the cluster, a general clock generated in the cluster is not used for rewriting the configuration control register to enable the rewriting of the configuration control register regardless of the states of the other units (for example, failure, clock stop state).

When the read/write of the configuration control information to the configuration control register is directly performed by the logic circuit using an operation code of the central processing unit CPU, it is necessary to provide much hardware because each bit constituting the configuration control register is dispersed in each of the units of the cluster.

As explained above, a conventional configuration control is performed by the service processor. That is, the change of the content of the configuration control register is based on the scan-in/out operation of the scanning means and the read/write operation from and to the main memory unit at the command of the service processor SVP.

Accordingly, a long processing time (about 5 to 6 seconds) is required in the conventional control system for changing the configuration. Particularly, when rewriting the configuration control register, the whole system is temporarily stopped as explained above. Further, it is necessary to perform the change of the configuration of a plurality of service processors in a large scale data processing system, and as a result, a longer stop time is needed.

A configuration control system in a data processing system according to the present invention is explained in detail hereinafter.

Figure 3:
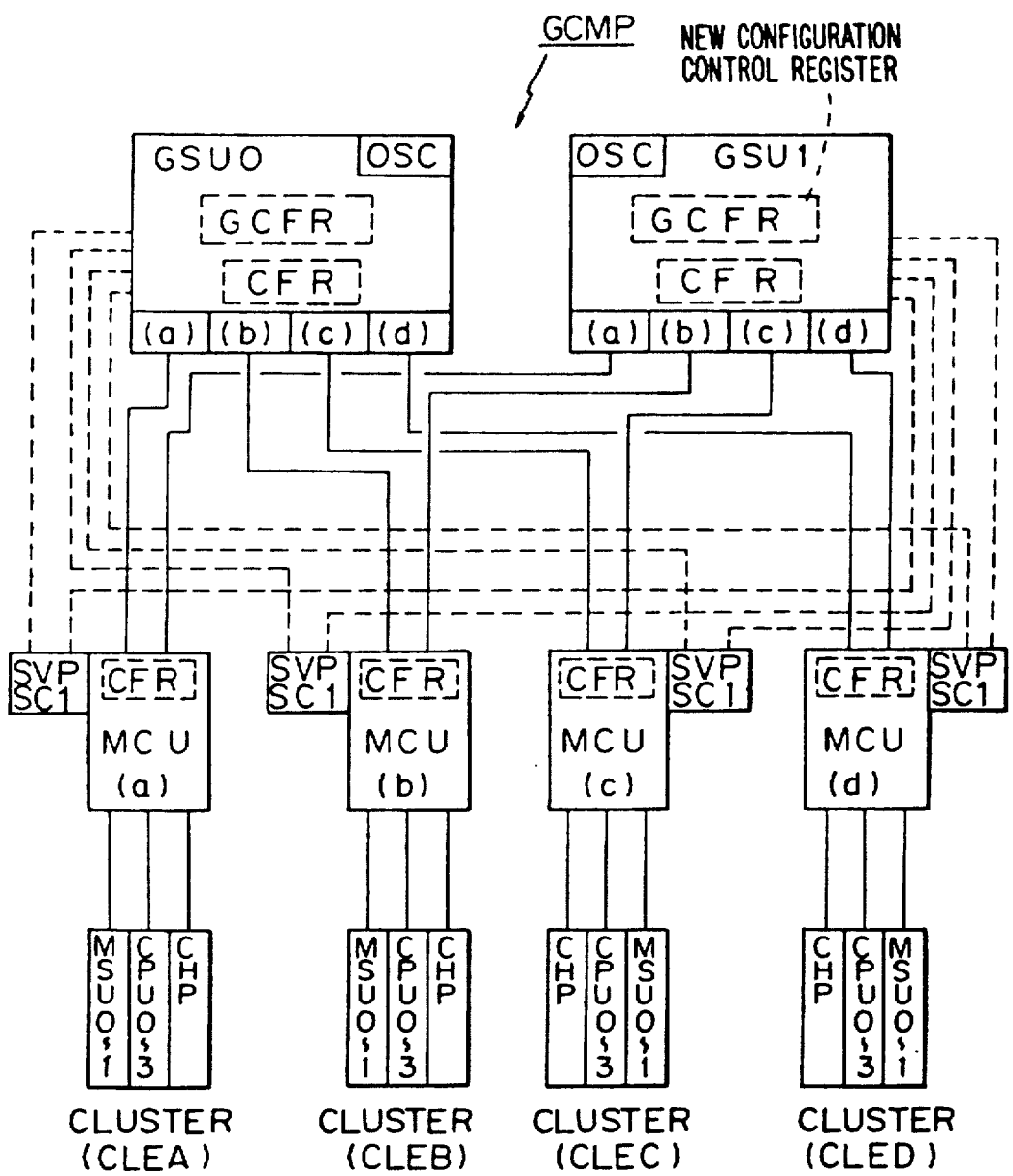
FIG. 3 is a schematic block diagram of a data processing system according to the present invention.

This configuration control system is advantageously applied to a data processing system having a large scale and complicated system configuration as shown in FIG. 3.

This data processing system GCMP is constituted by two global storage units GSU0 and GSU1 and clusters CLEA to CLED. Each of the clusters CLEA to CLED comprises a service processor SVP, a memory control unit MCU, a channel processor CHP, central processing units CPU0 to CPU3 and main storage units MSU0 and MSU1. The configuration control register CFR is provided in each of memory control units MCU and each of the global storage units GSU, as in the conventional system shown in FIG. 1. Further, a new configuration control register GCFR according to the present invention is provided in each of the global storage units GSU0 and GSU1. The configuration control according to the present invention is performed between the global storage unit GSU and each of the clusters CLEA to CLED. According to the present invention, control of the change of the configuration can be performed at a high speed due to the relationship between the global storage unit GSU and each of the clusters CLEA to CLED in the data processing system shown in FIG. 3.

In general, a high reliability and "non-stop operation" of the system are required in a data processing system having a large scale and complicated configuration; for example, the system shown in FIG. 3. The "non-stop operation" means that the stop time required for changing the configuration of the system is very short (within 1 second), and thus is almost negligible. Accordingly, such a system is divided into two systems, i.e., a current system (GSU0 side), and a stand-by system (GSU1 side), to achieve the "non-stop operation". In this system, when a failure is discovered by the global storage unit through a mutual communication within the current system, the current system is disconnected and the processing performed in the current system is taken over by the stand-by system. In another case, the data processed by the current system is written to both global storage units, and if one global storage unit discovers a failure, that global storage unit is disconnected and the other global storage unit continues the processing. Accordingly, it is possible to obtain a data processing system having a high reliability and "non-stop operation" based on the above steps.

As is obvious from the above, a high speed change of configuration, i.e., the high speed disconnection of the unit and the continuation of processing after disconnection, are necessary for a "non-stop operation" of the system.

Accordingly, the object of the present invention lies in the achievement of a high speed and "non-stop operation" of the data processing system. The basic steps therefor are explained hereinafter.

(1) A specific order is provided for writing/reading the configuration control information between the global storage unit and the cluster and the new configuration control register GCFR according to the present invention.

(2) The new configuration control register GCFR is provided in each of the global storage units GSU0 and GSU1, and AND gates are added to judge the online state between the global storage unit GSU and the cluster CLE. These AND gates are opened when obtaining the conjunction between the bit of the new configuration control register GCFR and the conventional configuration control register CFR.

(3) In response to the write order of the configuration control information, the configuration control information is written to the area of the main memory unit MSU designated by the write order by the same control as the data transmission control from the global storage unit GSU to the main memory unit MSU. In this case, the configuration control information held by the global storage unit is held on the read data bus from the global storage unit.

In response to the read order, the content of the area of the main memory unit MSU designated by the read order is set to the configuration control register GCFR by the same control as the data transmission control from the main storage unit MSU to the global storage unit GSU. In this case, the content of the data bus from the main storage unit to the global storage unit is the data of the change for rewriting the content of the configuration control register GCFR.

As explained above, since the content of the configuration control register GCFR can be changed, based on the load/store order at normal speed, and the configuration control register GCFR can control the connect on/disconnection between the cluster CLE and the global storage unit GSU, it is possible to control the change of the configuration (for example, connection/disconnection of the cluster when a failure occurs) without stopping the operation of the cluster CLE.

Figure 4:
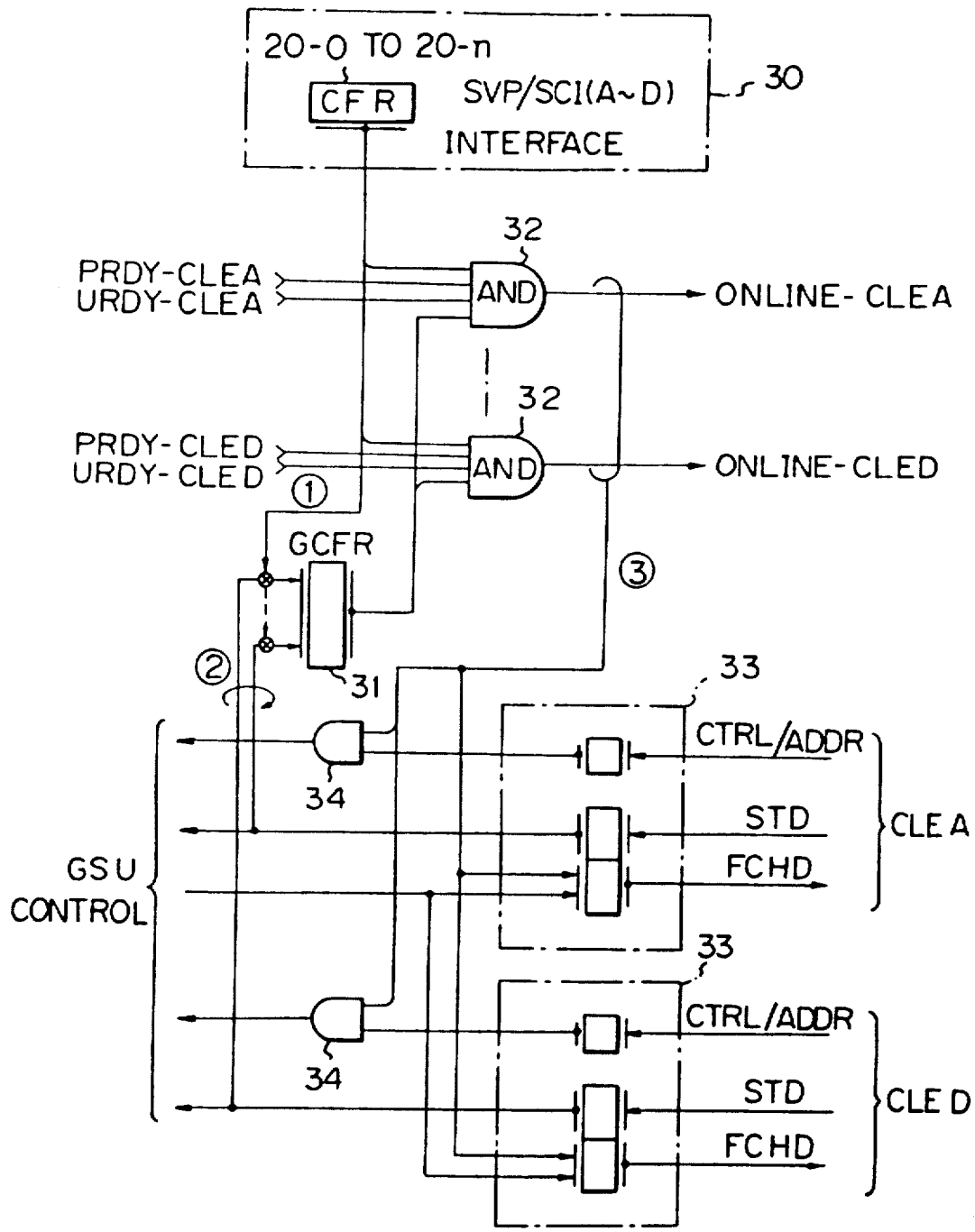
FIG. 4 is a schematic block diagram of a configuration control system according to the present invention.

FIG. 4 is a schematic block diagram of a configuration control system according to the present invention.

In FIG. 4, 30 denotes an interface unit having first configuration control registers CFR (20-0 to 20-n) each of which holds the connection information of each of the units in the cluster, and 31 denotes a second configuration control register GCFR holding the configuration control information between the global storage unit and the cluster. The specific order is provided for writing/reading the configuration control information to the second configuration control register GCFR. References 32 and 34 denote AND gates, and 33 denotes interface circuits. PRDY-CLEA and URDY-CLEA denote status indicating signals, the former denoting the power-ON signal of the cluster CLEA and the latter denoting the ready signal indicating the operation of each unit in the cluster CLEA. ONLINE-CLEA denotes the online state of the cluster CLEA. CTRL denotes the control signal, ADDR an address signal, STD a store data and FCHD a fetch data signal. Further, ① and ② denote write circuits, ③ denotes a read circuit.

Figure 5:
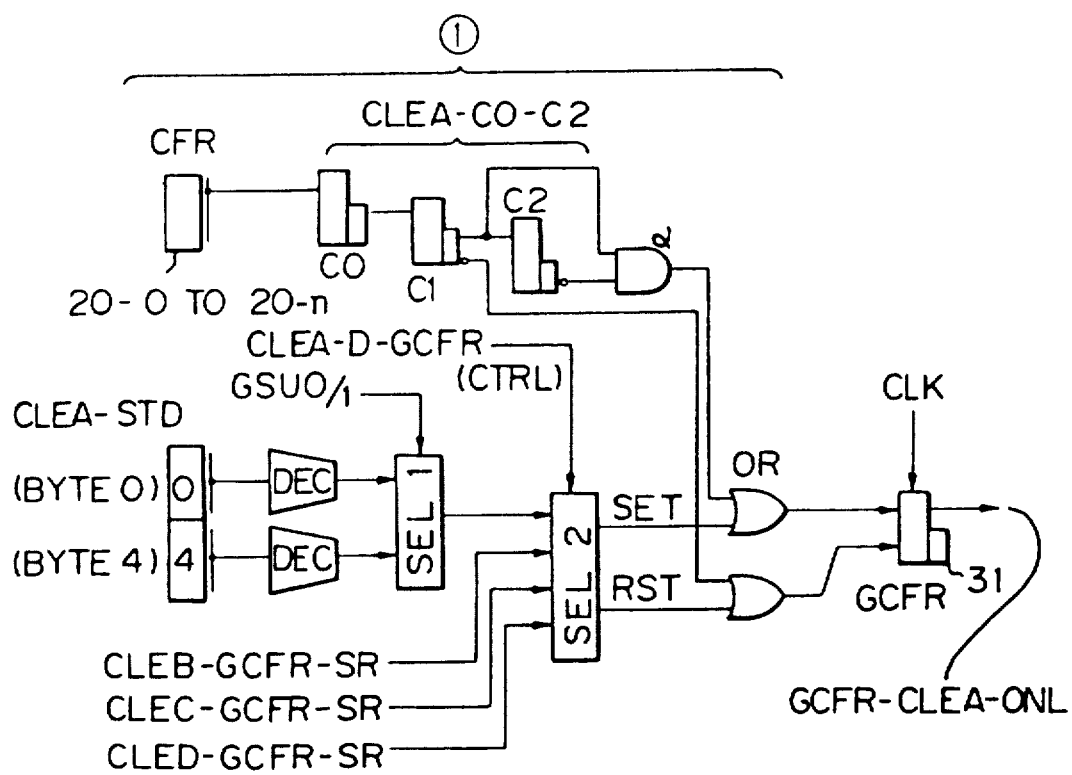
FIG. 5 is a detailed block diagram of the second configuration control register according to the present invention.
Figure 6:
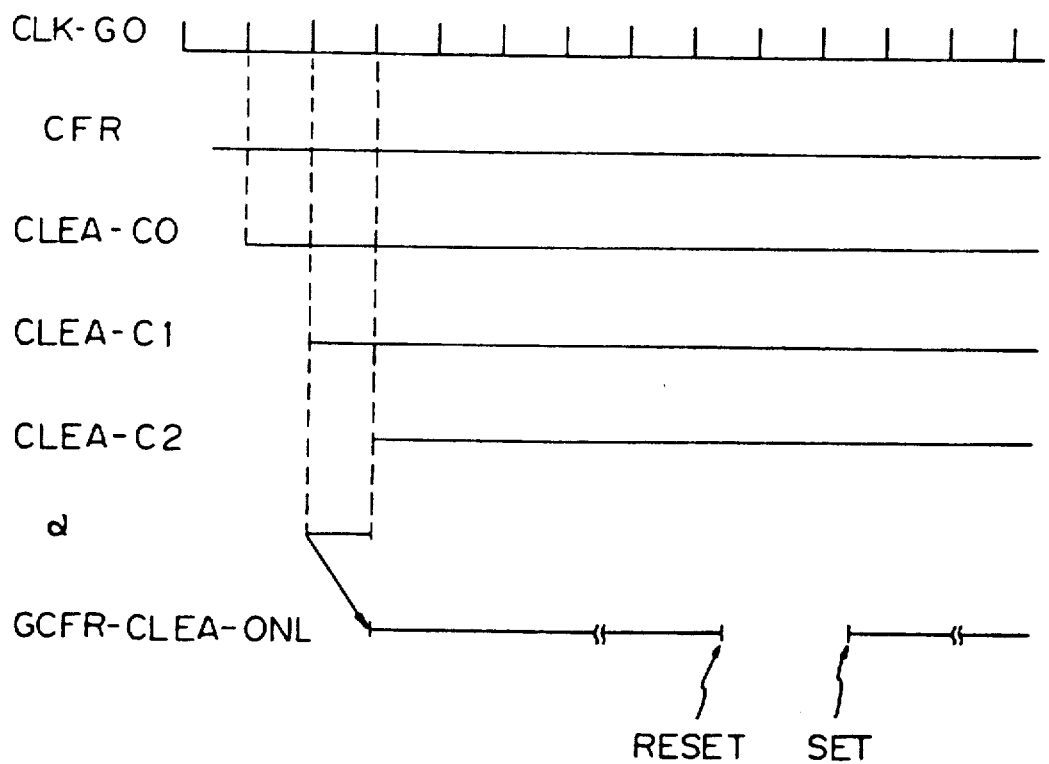
FIG. 6 is a signal timing chart for explaining the operation of the second configuration control register.

FIG. 5 is a detailed block diagram of the second configuration control register GCFR according to the present invention, and FIG. 6 is a signal timing chart of the second configuration control register shown in FIG. 5.

In FIG. 5, DEC denotes a decoder and SEL1 and SEL2 selectors. Further, CLEB-GCFR-SR denotes a set/reset signal from the cluster CLEB. The selector SEL1 selects one of the global storage units GSU0 and GSU1, and the selector SEL2 selects one of the configuration control registers CLEA to CLED based on the control signal CTRL. The same circuit as the above is provided for the clusters CLEB to CLED.

The operation of the second configuration control register is explained in detail hereinafter with reference to FIGS. 4 to 6.

INITIALIZATION

In the initialization process, the change of the system configuration is performed by the conventional configuration control register CFR shown in FIG. 2, through the service processor SVP, because it is not necessary to take the processing time into consideration for changing the configuration. In this case, the configuration control information is set to the first configuration control register CFR.

As is obvious from the configuration control register GCFR shown in FIG. 5 (this circuit is shown by one bit as an example), each bit is constituted by a master-slave type flip-flop circuit C0 to C2 having a priority function for a reset operation (reset-priority type). When the first configuration control register CFR is set to the reset state, the second configuration control register GCFR is also set to the reset state. When the specific bit of the first configuration control register CFR is changed to the set state (i.e., changed from disconnection to connection), the corresponding bit of the second configuration control register GCFR (31) is simultaneously turned ON by a leading signal α of the AND gate A through the OR gate. As a result, the line connected between the global storage unit GSU and the cluster CLE is activated and enters the online state (GCFR-CLEA-ONL).

This method facilitates the initialization of the second configuration control register GCFR. Further, it is possible to easily include the disconnected clusters in the whole system.

CHANGE OF THE CONFIGURATION AT NORMAL SPEED

The change of the configuration for this case can be performed by only rewriting the content of the first configuration control register CFR.

CHANGE OF THE CONFIGURATION BY HIGH SPEED

The change of the configuration for this case can be performed by directly rewriting the content of the second configuration control register GCFR using the specific order according to the present invention, so that it is possible to obtain the connection between the global storage unit GSU and the cluster CLE.

This rewriting of the second configuration control register GCFR can be performed by the control signal CTRL/ADDR and the configuration control information STD, the control signal CTRL/ADDR being given by a specific order from all clusters entering the online state.

When the change of the configuration is performed for a cluster entering the offline state, the content of the first configuration control register CFR is rewritten by a normal speed change, the cluster of the offline state is then included into the system, and the specific order is generated for changing the configuration. In this case, although a high speed change of the configuration cannot be achieved, problems do not occur because that cluster enters the offline state from the beginning.

FIG. 6 is a signal timing chart for explaining the operation of the second configuration control register GCFR shown in FIG. 5. In FIG. 6, CLK-G0 denotes a clock signal generated from an oscillator OSC in the global storage unit GSU0, CLEA-C0, C1, C2 denote a signal generated from each flip-flop circuit C0, C1, and C2. The signal α denotes the leading signal obtained from the AND gate A. That is, the signal α is obtained by the conjunction between the flip-flop C1 and the flip-flop C2. Further, GCFR-CLEA-ONL denotes the online state between the global storage unit GSU and the cluster CLEA. This line is set or reset by the reset signal RST or the set signal SET.

Figures 7, 8:
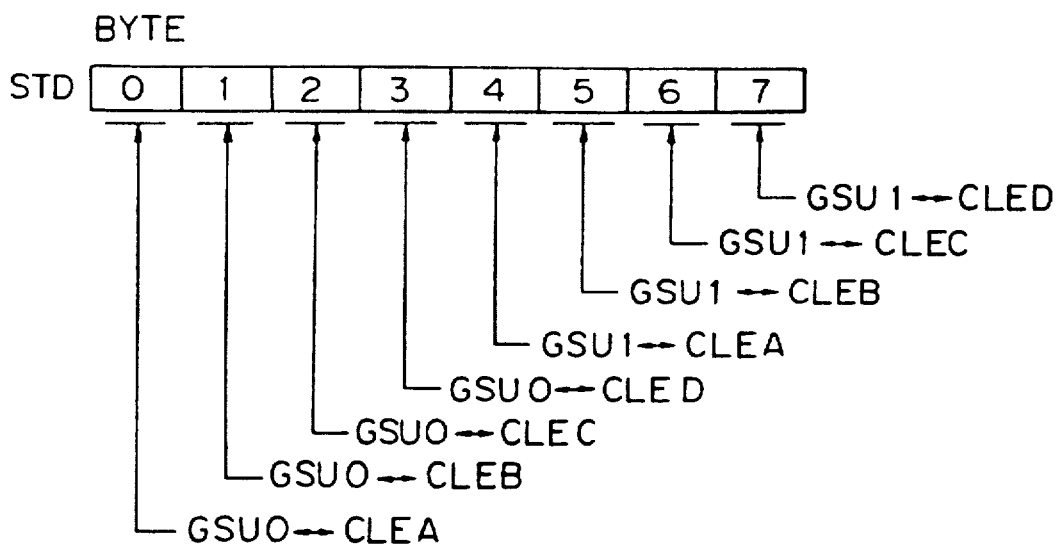
FIG. 7 shows data for the change of the configuration.
FIG. 8 shows write data indicating the relationship between the global storage unit and the cluster.

FIG. 7 shows the data of the change of the configuration. In FIG. 7, HEX denotes a hexadecimal number, the designation of the connection is given by "BYTE 02" ("00000010") and the designation of the disconnection given by "BYTE 03" (00000011). Further, designation of the non-change state is given by "OTHER" BYTE.

FIG. 8 shows write data indicating the relationship between the global storage unit and the cluster. The write data STD is data on the write data bus used for normal data transmission from the main memory unit MSU to the global storage unit. In the specific order according to the present invention, the write data STD is transferred to the second configuration register GCFR through the interface 33 and written thereto as shown in FIG. 4 (write circuit ②) In FIG. 8, for example, BYTE 0 denotes the relationship of the connection between the global storage unit GSU0 and the cluster CLEA. Accordingly, the write data STD of the "BYTE 0" is expressed by eight bits which are all "0". As another example, BYTE 4 denotes the relationship of the connection between the global storage unit GSU1 and the cluster CLEA. In this case, the write data STD of the "BYTE 4" is expressed by eight bits as "00000100".

As explained in FIG. 5, when the corresponding bit of the first configuration control register CFR (20-1 to 20-n) changes from "OFF" ("0") to "ON" ("1"), the corresponding bit of the second configuration control register GCFR 31 changes from "OFF" to "ON" based on the leading signal α. Further, when the specific order for reading according to the present invention is given, the set signal SET and the reset signal RST are generated at every bit in accordance with the content of the write data CLEA-STD from the main memory unit MSU, and the second configuration control register GCFR is rewritten based on the above operation as shown in FIG. 6.

In this case, since the content of the second configuration control register GCFR is changed in synchronization with the normal clock of the normal logic circuit, it is not necessary to stop the whole system when the content of the second configuration control register GCFR is changed.

In the specific order for writing according to the present invention, the content of the second configuration control register GCFR is transferred to the data bus from the global storage unit GSU to the cluster CLE and written to the designated area of the main memory unit MSU of the cluster CLE as shown by ③ in FIG. 4.

I claim:

1. A configuration control system for changing a system configuration of a data processing system having a plurality of clusters and at least one global storage unit, each of said clusters having cluster units including at least one central processing unit, at least one main storage unit, a memory control unit and a service processor, and said at least one global storage unit being connected in parallel to each of the plurality of clusters, said configuration control system comprising:
- a first configuration control means for holding connection information of each of said cluster units in each of said clusters;
- a second configuration control means for holding configuration control information of said at least one global storage unit and said plurality of clusters said second configuration control means being controlled independently from said first configuration control means;
- means for generating a specific order for writing said configuration control information to said second configuration control means; and
- defining means for defining a connection between the global storage unit and the clusters in accordance with the configuration control information of the second configuration control means, and automatically setting the configuration control information to said second configuration control means when corresponding said control information is set to said first configuration control means.

2. A configuration control system as claimed in claim 1, wherein each of said first and second configuration control means is a register.

3. A configuration control system as claimed in claim 1, wherein said second configuration control means is provided in said at least one global storage unit.

4. A configuration control system as claimed in clam 1, wherein the configuration control information includes first and second configuration information, and said defining means comprises an AND gate obtaining a logical product between the first configuration control information of the first configuration control means and the second configuration control information of the second configuration control means, and the connection state between the global storage unit and clusters is defined based on an output of the AND gate.

5. A configuration control system as claimed in claim 1, wherein said first configuration control means is rewritten by the service processor.

6. A configuration control system as claimed in claim 1, further comprising means for receiving the specific order and rewriting the second configuration control means.

7. A configuration control system as claimed in claim 1, wherein said first configuration control means is rewritten by a service processor and comprises means for receiving the specific order and rewriting the second configuration control means.

8. A configuration control system as claimed in claim 7, wherein a second speed for rewriting the second configuration control means by the rewriting means is faster than a first speed for rewriting the first configuration control means by using the service processor.

* * * * *